United States Patent
Lin et al.

(10) Patent No.: US 9,746,965 B2
(45) Date of Patent: Aug. 29, 2017

(54) LIGHT SOURCE DEVICE AND ADJUSTING METHOD THEREOF USING ADJUSTING MECHANISM

(71) Applicants: Yao-Shun Lin, Hsin-Chu (TW); Chien-Ting Liao, Hsin-Chu (TW)

(72) Inventors: Yao-Shun Lin, Hsin-Chu (TW); Chien-Ting Liao, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 177 days.

(21) Appl. No.: 14/520,366

(22) Filed: Oct. 22, 2014

(65) Prior Publication Data
US 2015/0355781 A1    Dec. 10, 2015

(30) Foreign Application Priority Data
Jun. 6, 2014   (TW) .............. 103119776 A (51) Int. Cl.
G09G 3/00       (2006.01)
G06F 3/042      (2006.01)

(52) U.S. Cl.
CPC ................. *G06F 3/0425* (2013.01)

(58) Field of Classification Search
CPC .. H04N 1/00249; H04N 1/00267; H04N 5/74; H04N 5/7408; H04N 5/7475–5/76; H04N 9/31–9/3197; H04N 13/0459; H04N 21/412; H04N 2201/0438; H04N 2201/0452; Y10S 353/00–353/06; G06F 1/1639; G06F 1/1645; G06F 3/0425;
(Continued)

(56) References Cited

U.S. PATENT DOCUMENTS

| 2007/0086085 | A1* | 4/2007 | Kitaoka ................. G02B 7/004 359/362 |
| 2008/0278460 | A1* | 11/2008 | Arnett ................. G02B 6/0045 345/175 |
| 2011/0083109 | A1 | 4/2011 | Hildebrandt et al. |

(Continued)

FOREIGN PATENT DOCUMENTS

| CN | 102914937 | 2/2013 |
| JP | 2011501841 | 1/2011 |
| TW | 201413366 | 4/2014 |

OTHER PUBLICATIONS

"Office Action of Taiwan Counterpart Application", issued on Sep. 9, 2015, p. 1-p. 3.

*Primary Examiner* — Sanghyuk Park
(74) *Attorney, Agent, or Firm* — Jianq Chyun IP Office (57) ABSTRACT

A light source device including a light source module and an adjusting mechanism is provided. The light source module includes a base, a first light source and at least two second light sources. The first light source is disposed on the base and adapted to emit an invisible light curtain, wherein the invisible light curtain ranges over a display plane. The second light sources are disposed on the base and adapted to emit a first visible light beam and a second visible light beam respectively, wherein the first visible light beam is parallel to the invisible light curtain and the second visible light beam is parallel to the invisible light curtain. The adjusting mechanism is disposed on the base and used to adjust relative positions of the base and the display plane. In addition, an adjusting method of the light source device is also provided.

19 Claims, 9 Drawing Sheets

(58) Field of Classification Search
CPC ............... G06F 3/03547; G06F 3/0428; G02B 21/36–21/368; G02B 27/18–27/20
See application file for complete search history.

(56) References Cited

U.S. PATENT DOCUMENTS

| | | |
|---|---|---|
| 2011/0122097 A1 | 5/2011 | Tsang et al. |
| 2011/0291988 A1* | 12/2011 | Bamji ................... G06F 3/0428 345/175 |
| 2012/0229428 A1* | 9/2012 | Tavakoli ............. G06F 3/03545 345/179 |
| 2014/0313166 A1* | 10/2014 | Rattray ................ H04N 9/3179 345/175 |

* cited by examiner

LIGHT SOURCE DEVICE AND ADJUSTING METHOD THEREOF USING ADJUSTING MECHANISM

CROSS-REFERENCE TO RELATED APPLICATION

This application claims the priority benefit of Taiwan application serial no. 103119776, filed on Jun. 6, 2014. The entirety of the above-mentioned patent application is hereby incorporated by reference herein and made a part of this specification.

BACKGROUND OF THE INVENTION

1. Field of the Invention

The invention relates to an optical device and an adjusting method thereof, and particularly relates to a light source device and an adjusting method of the light source device.

2. Description of Related Art

An interactive projection system is a projection system that allows the user to perform a touch operation on a projection plane. In the interactive projection system, an invisible light (e.g. infrared light) curtain emitted from a light source device ranges over the whole projection plane. Therefore, the invisible light curtain may be reflected by a touch object (e.g. the user's finger or a stylus) to generate a reflected light beam when the user performs an interactive touch operation to a projected image on the projection plane, thereby using an invisible light detecting device to receive the reflected light beam and detect a touch position. Thus, a corresponding touch signal may be generated.

The distance between the invisible light curtain and the projection plane may influence the touch operation. Specifically, if the distance between the invisible light curtain and the projection plane is overly long, the touch object (e.g. the user's finger or a stylus) may be present in a region between the invisible light curtain and the projection plane when the user performs the touch operation on the projection plane, such that the light detecting device may detect an incorrect touch position and generates an unexpected touch signal. Namely, a touch sensitivity is overly high. On the contrary, if the distance between the invisible light curtain and the projection plane is overly short, the touch object may easily block the reflected light beam when the user performs the touch operation on the projection plane, thus, the light detecting device is unable to detect the touch position and generate the touch signal. Namely, the touch sensitivity is overly low. Therefore, the distance between the invisible light curtain and the projection plane needs to be appropriately adjusted so that the touch may be input normally.

A conventional method for adjusting the distance between the invisible light curtain and the projection plane is that the distance between the invisible light curtain and the projection plane is determined and adjusted by using a single visible light beam coinciding with the invisible light curtain. However, such method only provides the distance between the single visible light beam and the projection plane, and the distances between other positions of the invisible light curtain and the projection plane are unable to be determined by the method whether the distances are adjusted appropriately or not. In other words, the conventional adjusting method is not able to make the invisible light curtain completely and precisely parallel to the projection plane.

China patent publication no. 102914937A has disclosed a projection system having a touch capability. The projection system is capable of sensing a touch input by an invisible light curtain emitted from a light-emitting module. Three contact elements are disposed on the light-emitting module, such that contacts of the contact elements with the projection plane are used to determine whether the invisible light curtain emitted from the light-emitting module is parallel to the projection plane. US patent publication no. 20110083109 has disclosed an electronic whiteboard system. In the electronic whiteboard system, a visible light beam emitted by a laser positioning sensing unit is configured to determine a distance between a sensing plane thereof and a projecting plane of the whiteboard.

SUMMARY OF THE INVENTION

The invention provides a light source device and an adjusting method thereof capable of conveniently and accurately adjusting the distance between an invisible light curtain and a display plane that the invisible light curtain ranges over.

Other objects and advantages of the invention can be further illustrated by the technical features broadly embodied and described as follows.

To achieve one or part or all of the objects or other objects, an embodiment of the invention provides a light source device including a light source module and an adjusting mechanism. The light source module includes a base, a first light source, and at least two second light sources. The first light source is disposed on the base and adapted to emit an invisible light curtain, wherein the invisible light curtain ranges over a display plane. The at least two second light sources are disposed on the base and adapted to respectively emit a first visible light beam and a second visible light beam, wherein the first visible light beam is parallel to the invisible light curtain, and the second visible light beam is parallel to the invisible light curtain. The adjusting mechanism is disposed on the base and adapted to adjust relative positions of the base and the display plane.

To achieve one or part or all of the objects or other objects, an embodiment of the invention provides an adjusting method of a light source device, including steps as follows. A light source module is provided, wherein the light source module includes a first light source and at least two second light sources, the first light source emits an invisible light curtain, the invisible light curtain ranges over a display plane, and the at least two second light sources respectively emit a first visible light beam and a second visible light beam, wherein the first visible light beam being parallel to the invisible light curtain, and the second visible light beam being parallel to the invisible light curtain. An adjusting mechanism disposed on the light source module is provided. Relative positions of the first visible light beam and the second visible light beam with respect to the display plane are observed. Relative positions of the invisible light curtain and the display plane are adjusted by using the adjusting mechanism based on the relative positions of the first visible light beam and the second visible light beam with respect to the display plane.

Based on the above, the embodiments of the invention have at least one of the following characteristics. In the embodiments of the invention, the relative positions of the invisible light curtain and the display plane are determined and adjusted by visually observing two visible light beams (i.e. the first visible light beam and the second visible light beam) parallel to but not coinciding with or parallel to and coinciding with the invisible light curtain. Since the visible light beams may form a plane parallel to but not coinciding with or parallel to and coinciding with the invisible light curtain, whether distances between all positions of the invisible light curtain and the projection plane are adjusted appropriately may be correctly determined by using the above-mentioned method, thereby improving the accuracy of the adjustment to the invisible light curtain. In addition, since two visible light beams, instead of one visible light beam as in the conventional techniques, are adapted as the basis of adjustment in the above-mentioned method, it only needs to set the visible light beams to be parallel to or coincide with the invisible light curtain during an assembling and configuring process of the light source device. Thus, the light source device becomes more accurate after the adjustment described above as compared with setting only one visible light beam to be parallel or coincide with the invisible light curtain.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
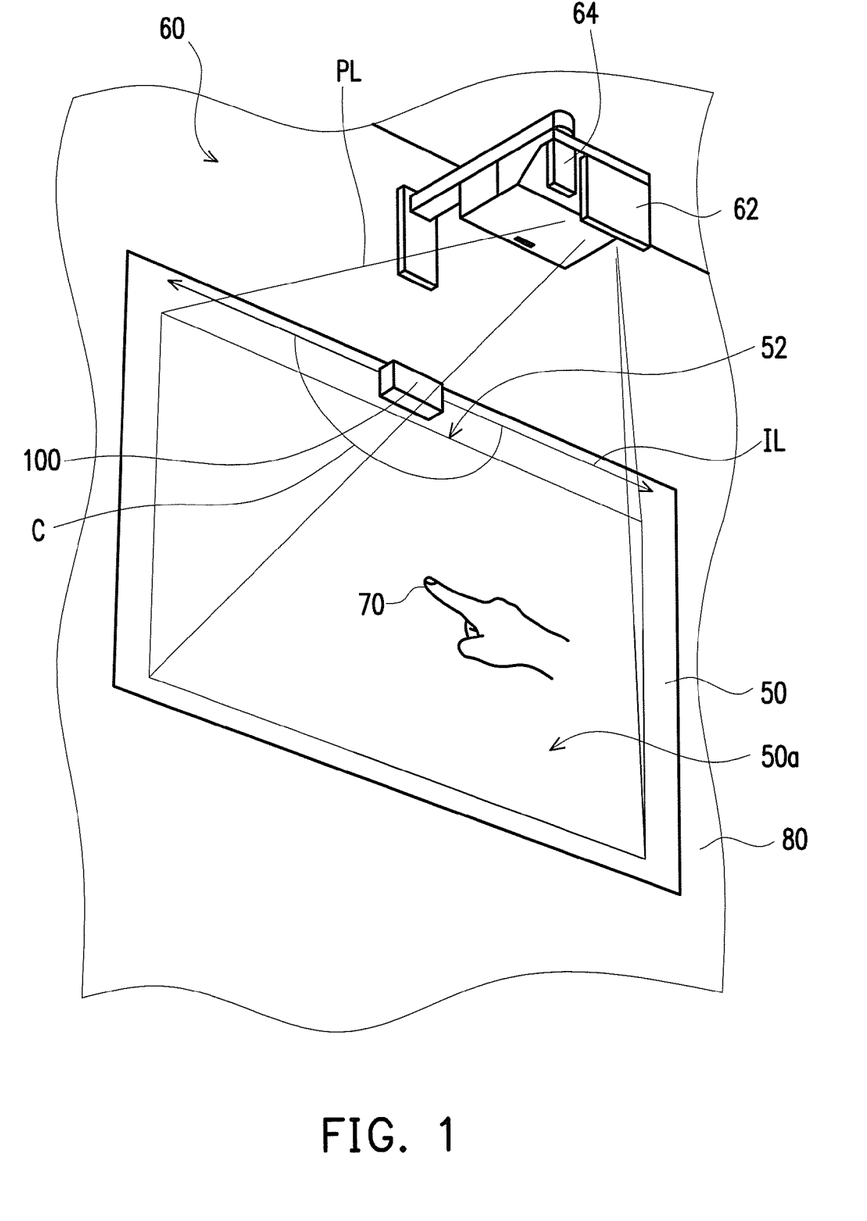
FIG. 1 is a schematic view illustrating a light source device according to an embodiment of the invention used in an interactive touch control system.

FIG. 1 is a schematic view illustrating a light source device according to an embodiment of the invention used in an interactive touch control system. Referring to FIG. 1, a light source device 100 of this embodiment is adapted for an interactive touch control system 60. The interactive touch control system 60 includes a display device 62 and an invisible light detecting device 64, wherein the display device 62 is adapted to provide an image light beam PL to a display plane 50a. In the embodiment shown in FIG. 1, the interactive touch control system 60 is a projection interactive touch control system, and the display device 62 is a projection device. However, in other embodiments, the display device may also be a liquid crystal display (LCD) device, an organic light emitting diode (OLED) display device, and a cathode ray tube (CRT) display device, etc., the invention is not limited thereto. In the embodiment, the display plane 50a may be a projection plane, such as a partial surface of a white board 50 fixed at a wall surface 80, or a plane suitable to receive the image light beam PL. Accordingly, the display device (projection device) 62 of the embodiment may project the image light beam PL to the display plane (projection plane) 50a, and form a display image (not shown) on the display plane (projection plane) 50a.

The light source device 100 is disposed at a position on an edge 52 of the display plane 50a. For example, the light source device 100 may be disposed adjacent to a middle position on an upper edge of the display plane 50a. In addition, the light source device 100 is adapted to emit an invisible light beam IL (e.g. an infrared light beam). The invisible light beam IL is dispersed to form an invisible light curtain C parallel to the display plane 50a and ranges over the whole display plane 50a. A dispersing angle of the invisible light beam IL of the embodiment is greater than or equal to 180 degrees, but the dispersing angle of the invisible light beam IL may be smaller than 180 degrees according to a distance between the light source device and the display plane, the invention is not limited thereto. Moreover, the invention does not intend to limit the way that the light source device 100 provides the invisible light curtain C. The invisible light curtain C may be provided by using a laser element (e.g. an infrared light emitting element) to irradiate a conical reflecting surface, so that an infrared light beam is reflected and dispersed to form the invisible light curtain C. Moreover, other suitable optical elements may be used to generate the invisible light curtain C capable of ranging over the whole display plane 50a.

The invisible light detecting device 64 may be an invisible light camera. When the user performs a touch control to the display plane 50a to make an object 70 (e.g. the user's finger, a stylus, or other objects) approach the display plane 50a, the invisible light curtain C parallel to the display plane 50a is reflected by the object 70 to be detected by the invisible light detecting device 60. In this way, a touch position of the object 70 on the display plane 50a is detected, and the display device 62 may thus generate a corresponding touch image or an input action in the display image, thereby achieving interaction between the display image and the user. In addition, when the display device is an LCD display device, an OLED display device, or a CRT device, the invisible light detecting device may be disposed at a periphery of the display plane 50a. However, the invention is not limited thereto, as long as the invisible light detecting device is disposed at a position that enables the invisible light beam reflected by the object 70 to be detected.

Figure 2:
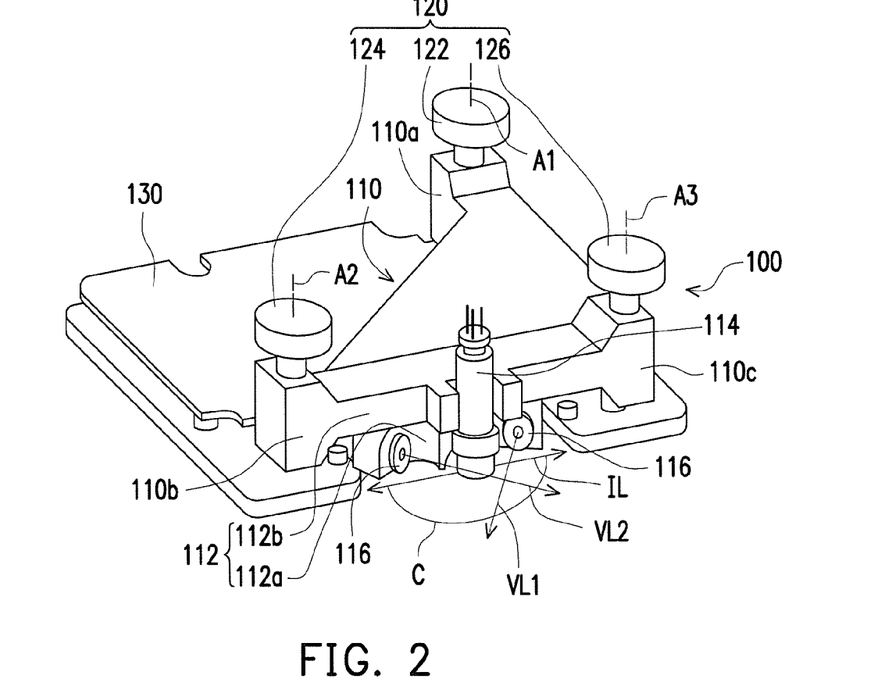
FIG. 2 is a perspective view illustrating the light source device of FIG. 1.
Figure 3:
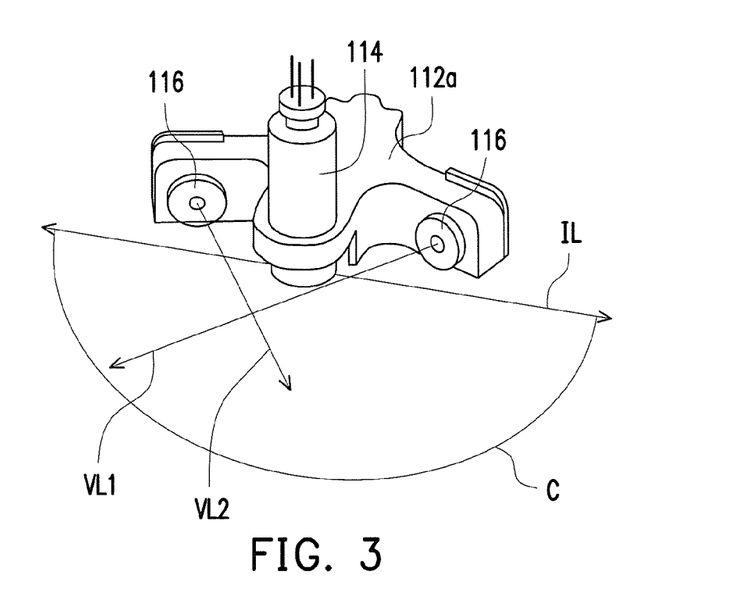
FIG. 3 is a partial structural perspective view illustrating the light source device of FIG. 2.

A configuration and operation of the light source device 100 are described in detail below. FIG. 2 is a perspective view illustrating the light source device of FIG. 1. FIG. 3 is a partial structural perspective view illustrating the light source device of FIG. 2. Referring to FIGS. 2 and 3, the light source device 100 of this embodiment includes a light source module 110 and an adjusting mechanism 120. The light source module 110 includes a base 112, a first light source 114, and at least two second light sources 116. The embodiment shown in FIGS. 2 and 3 include two second light sources 116. The base 112 includes a first component 112a and a second component 112b. The first component 112a and the second component 112b of the base 112 may be formed integrally or separately. In the embodiment shown in FIGS. 2 and 3, the first and second components 112a and 112b are formed separately. Namely, the base 112 is formed by assembling the first and second components 112a and 112b. However, the invention is not limited thereto.

The first light source 114 is disposed on the first component 112a of the base 112 and adapted to emit the invisible light curtain C. The second light sources 116 are disposed on the first component 112a of the base 112 and adapted to respectively emit a first visible light beam VL1 and a second visible light beam VL2. In the embodiment shown in FIGS. 2 and 3, the second light sources 116 are respectively disposed at opposing sides of the first light source 114 and in a direction that an included angle between the first visible light beam VL1 and the second visible light beam VL2 is formed. In addition, the first visible light beam VL1 and the second visible light beam VL2 are not parallel to and not collinear with each other (i.e. the included angle is not equal to 0 or 180 degrees). In other embodiments, the first visible light beam VL1 and the second visible light beam VL2 are parallel to each other but not collinear with each other. Namely, the visible light beams of the second light sources 116 have the same transmitting direction, however, the invention is not limited thereto. Moreover, the first visible light beam VL1 is parallel to the invisible light curtain C, and the second visible light beam VL2 is parallel to the invisible light curtain C. Also, the first visible light beam VL1 and the second visible light beam VL2 may or may not coincide with the light curtain C. The adjusting mechanism 120 is disposed on the second component 112b of the base 112 and adapted to adjust relative positions of the base 112 and the display plane 50a shown in FIG. 1.

Figure 4:
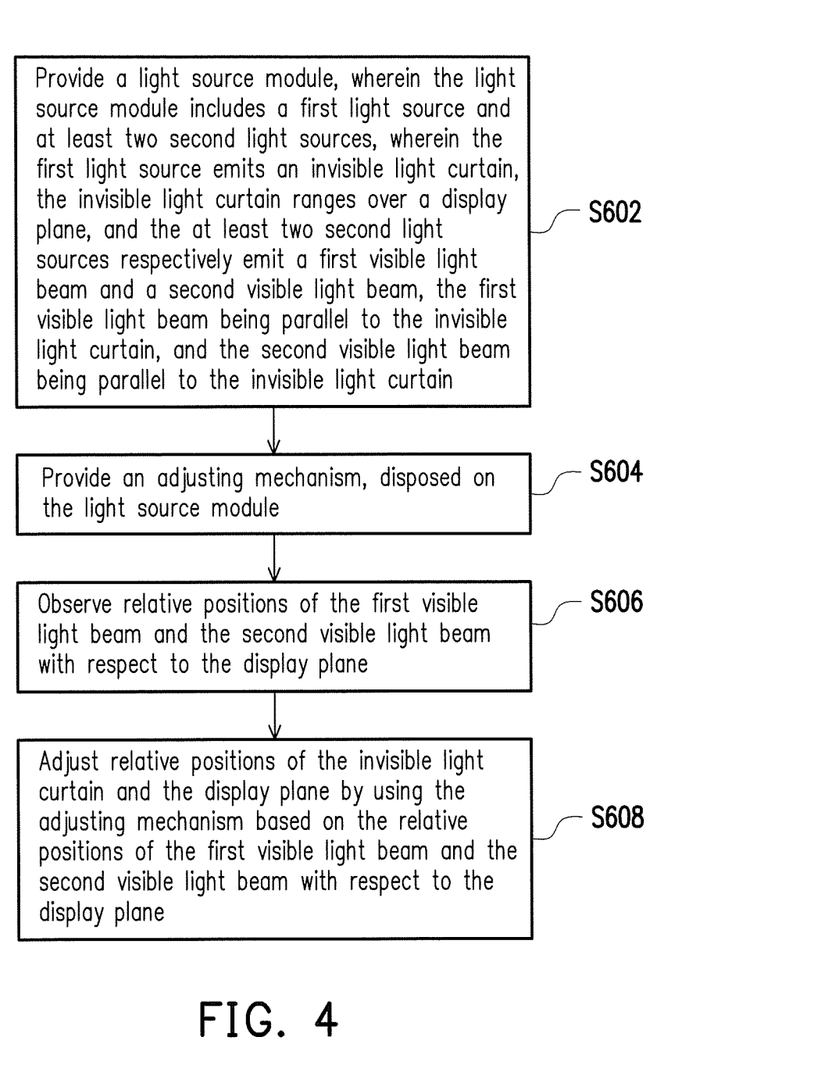
FIG. 4 is a flowchart illustrating an adjusting method of the light source device of FIG. 2.

In the following, the light source device 100 shown in FIGS. 1-3 is used as an example to describe an adjusting method of the light source device of the invention. FIG. 4 is a flowchart illustrating an adjusting method of the light source device of FIG. 2. Referring to FIG. 4, the light source module 110 shown in FIGS. 2 and 3 is provided. The light source module 110 includes the first light source 114 and the at least two second light sources 116. In addition, the first light source 114 emits the invisible light curtain C parallel to the display plane 50a shown in FIG. 1 and the invisible light curtain C ranges over the whole display plane 50a. The at least two second light sources 116 respectively emit the first visible light beam VL1 and the second visible light beam VL2, the first visible light beam VL1 is parallel to the invisible light curtain C, and the second visible light beam VL2 is parallel to the invisible light curtain C (Step S602). The adjusting mechanism 120 shown in FIG. 2 is provided. The adjusting mechanism 120 is disposed on the light source module 110 (Step S604). Then, relative positions of the first visible light beam VL1 and the second visible light beam VL2 with respect to the display plane 50a are observed (Step S606). Based on the relative positions of the first visible light beams VL1 and the second visible light beam VL2 with respect to the display plane 50a, relative positions of the invisible light curtain C and the display plane 50a are adjusted by using the adjusting mechanism 120 (Step S608).

Based on the configuration and adjustment of the light source device 100 described above, the relative positions of the invisible light curtain C and the display plane 50a are determined and adjusted by observing the visible light beams (i.e. the first visible light beam VL1 and the second visible light beam VL2) parallel to or coinciding with the invisible light curtain C. Since the visible light beams may form a plane parallel to but not coinciding with the invisible light curtain C or parallel to and coinciding with the invisible light curtain C, the method is capable of correctly determining whether distances between all positions of the invisible light curtain C and the display plane 50a are adjusted appropriately, thereby improving an accuracy and convenience of the adjustment to the invisible light curtain C. In addition, since two visible light beams, instead of one visible light beam as in the conventional techniques, are adapted as the basis for adjusting the invisible light curtain in the method, it only needs to set the visible light beams to be parallel to or coincide with the invisible light curtain C during a process of assembling and configuring the light source device 100, while the light source device 100 becomes more accurate after the adjustment as compared with setting only one visible light beam.

Figure 5A:
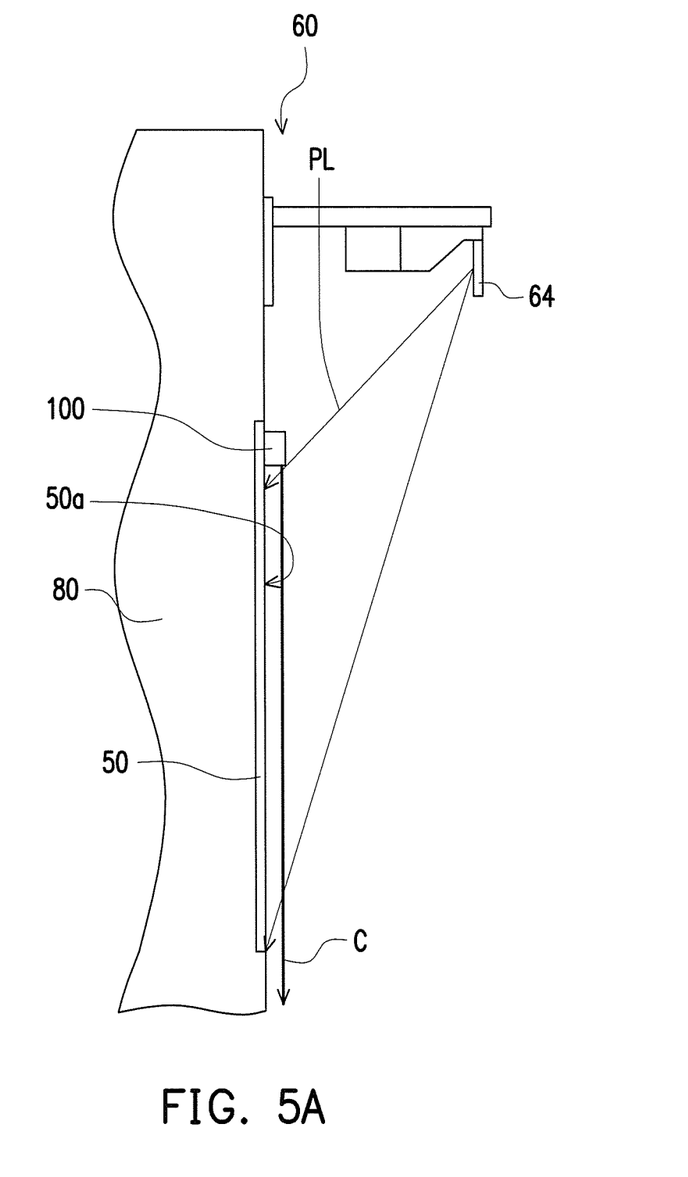
FIG. 5A is a side view illustrating the interactive touch control system and the light source device of FIG. 1.
Figure 5B:
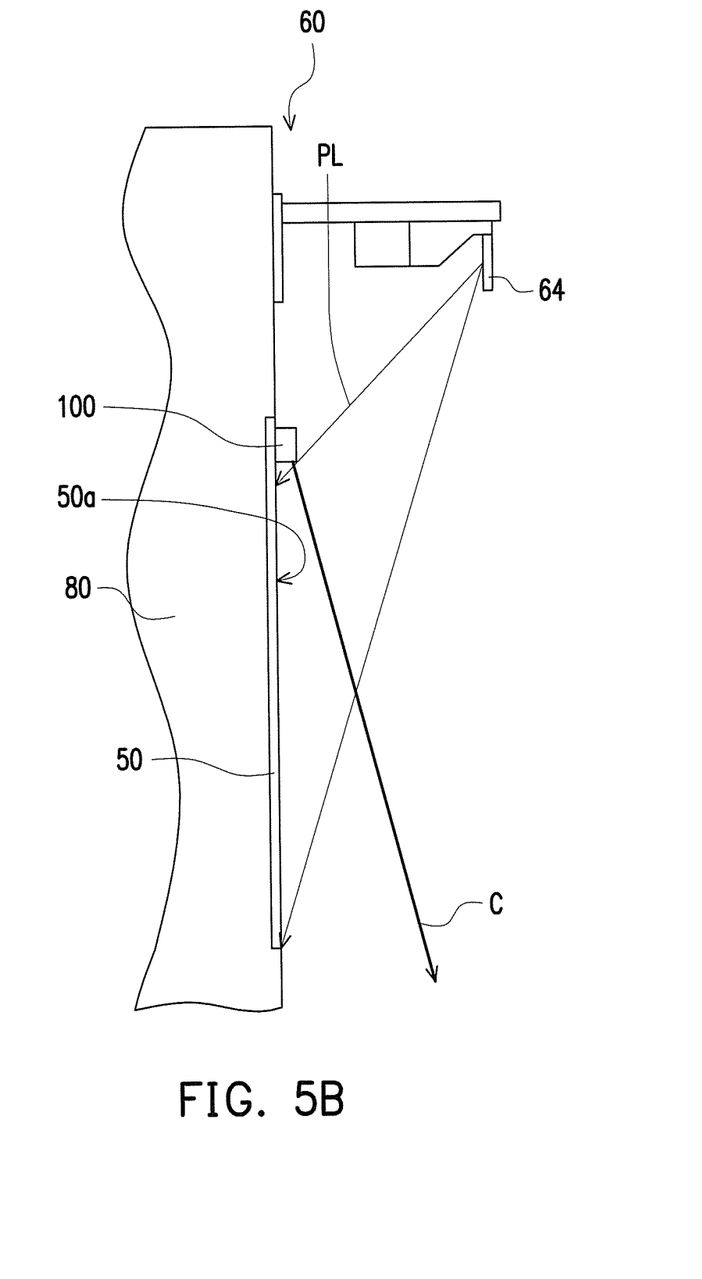
FIG. 5B is a schematic view illustrating that an invisible light curtain of FIG. 5A being overly away from a display plane.
Figure 5C:
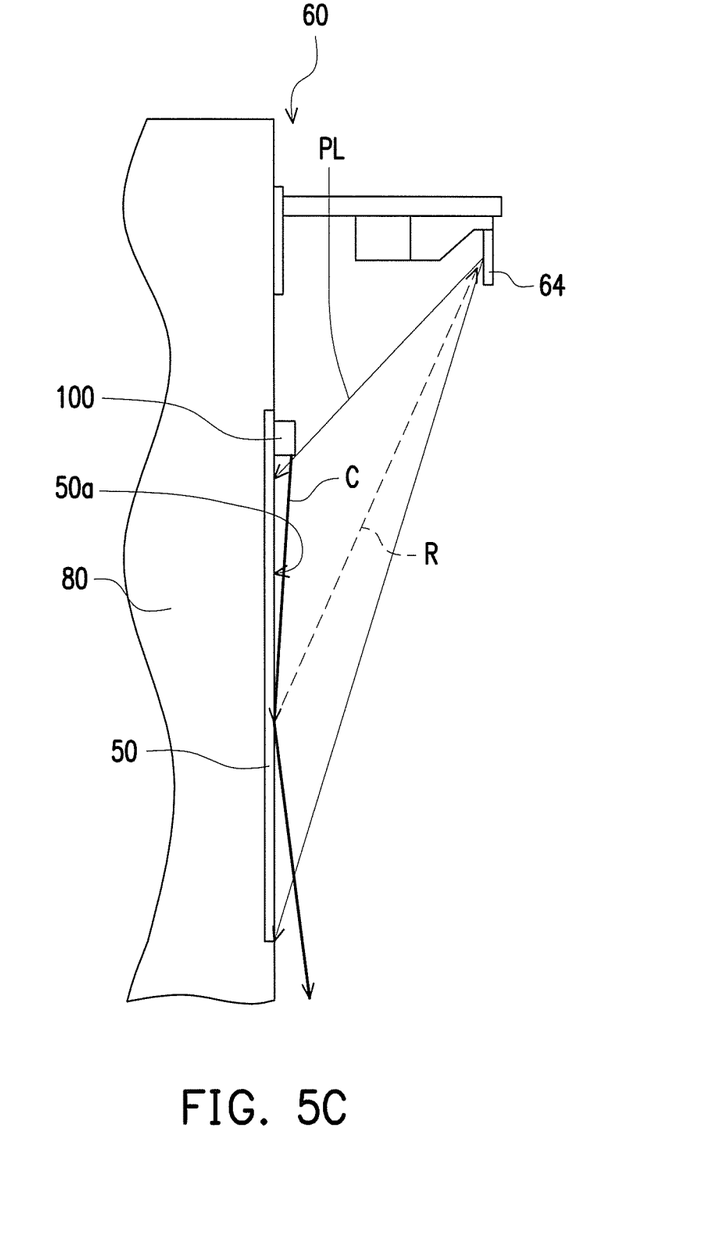
FIG. 5C is a schematic view illustrating that the invisible light curtain of FIG. 5A being overly close to the display plane.

FIG. 5A is a side view illustrating the interactive touch control system and the light source device of FIG. 1. FIG. 5B is a schematic view illustrating that an invisible light curtain of FIG. 5A being overly away from a display plane. FIG. 5C is a schematic view illustrating that the invisible light curtain of FIG. 5A being overly close to the display plane. Specifically, if the invisible light curtain C is overly away from the display plane 50a, as shown in FIG. 5B, a touch object (e.g. the user's finger or other objects) may be unexpectedly present in a region between the invisible light curtain C and the display plane 50a when the user performs a touch input operation on the display plane 50a, thus, the invisible light detecting device 64 may detect an incorrect invisible light beam and generate an unexpected touch signal. Namely, a touch sensitivity is overly high. On the contrary, if the invisible light curtain C is overly close to the display plane 50a, as shown in FIG. 5C, the reflected invisible light beam may be easily blocked by the touch object when the user performs a touch input operation on the display plane 50a, therefore, the invisible light detecting device 64 is unable to detect the invisible light beam reflected by the touch object and unable to correctly generate a touch signal. Namely, the touch sensitivity is overly low. In addition, the invisible light curtain C may be reflected by the display plane 50a, as shown in FIG. 5C, making a position of the touch input misjudged by the invisible light detecting device 64 based on a reflecting light beam R.

Based on the above, when the user realizes the invisible light curtain C is overly away from the display plane 50a, as shown in FIG. 5B, or is overly close to the display plane 50a, as shown in FIG. 5C by observing the relative positions (distance) of the first visible light VL1 and the second visible light VL2 of FIGS. 2 and 3 with respect to the display plane 50a (as shown in FIG. 1) at Step S606, the user may adjust the relative positions of the first visible light beam VL1 and the second visible light beam VL2 with respect to the display plane 50a to be consistent by using the adjusting mechanism 120, as described in Step S608, and the invisible light curtain C is also adjusted to be parallel to the display plane 50a and to keep an appropriate distance from the display plane 50a, as shown in FIG. 5A.

Moreover, as shown in FIGS. 1, 2, and 4, when Step S602 is performed, the first light source 114 of the light source module 110 may be turned on or turned off, while the second light sources 116 are turned on. In this way, the user is allowed to visually observe the relative positions of the visible light beam and the display plane at Step S606. When Step S608 is completed, namely the invisible light curtain C is adjusted to be parallel to the display plane 50a, the second light sources 116 of the light source module 110 may be turned off, while the first light source 114 may be turned on to allow the user to perform a subsequent touch input operation.

In this embodiment, the first visible light beam VL1 is not parallel to the second visible light beam VL2, as shown in FIGS. 2 and 3 (i.e. there is an included angle between the visible light beams), such that the first visible light beam VL1 and the second visible light beam VL2 may form a plane parallel to but not coinciding with the invisible light curtain C or a plane parallel to and coinciding with the light curtain C. In other embodiments, it is also in the scope of the invention if the first visible light beam VL1 and the second visible light beam VL2 also form a plane parallel to or coinciding with the invisible light curtain C.

An operation of the adjusting mechanism 120 is described in detail below. Referring to FIG. 2, the light source device 100 of this embodiment further includes a base body 130. The base body 130 is adjacent to and fastened on the display plane 50a shown in FIG. 1. In this embodiment, the base body 130 is adjacent to and fastened at the middle position of the upper edge of the display plane 50a. The second component 112b of the base 112 has a first connecting part 110a, a second connecting part 110b, and a third connecting part 110c. The adjusting mechanism 120 includes a first connecting element 122, a second connecting element 124, and a third connecting element 126. The first connecting element 122, the second connecting element 124, and the third connecting element 126 of the adjusting mechanism 120 are respectively disposed at the first connecting part 110a, the second connecting part 110b, and the third connecting part 110c. By using the first connecting element 122, the second connecting element 124, and the third connecting element 126 of the adjusting mechanism 120, the base 112 may be driven to move along a direction perpendicular to display plane 50a or be driven to rotate along an axial direction not perpendicular to the display plane 50a, so as to adjust the relative positions of the invisible light curtain C emitted by the first light source 114 on the base 112 and the display plane 50a. Details in this respect are provided below.

Figure 6:
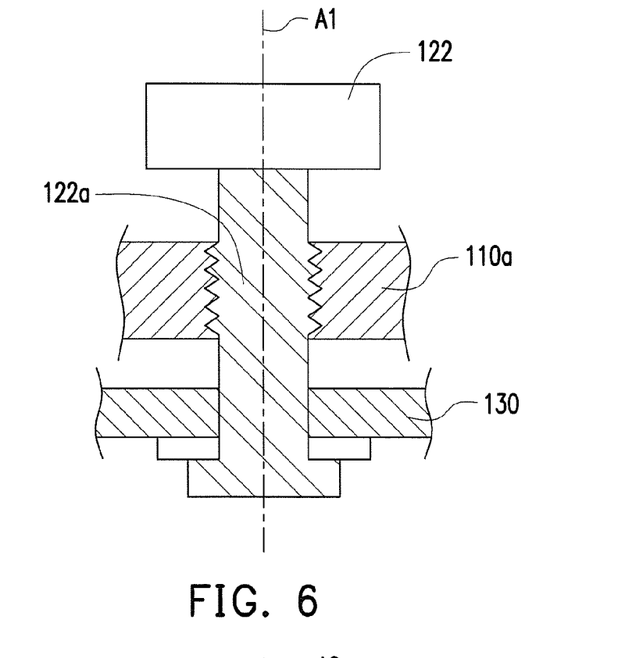
FIG. 6 is a cross-sectional view illustrating the light source device of FIG. 2 at a position of a first connecting element.
Figure 7:
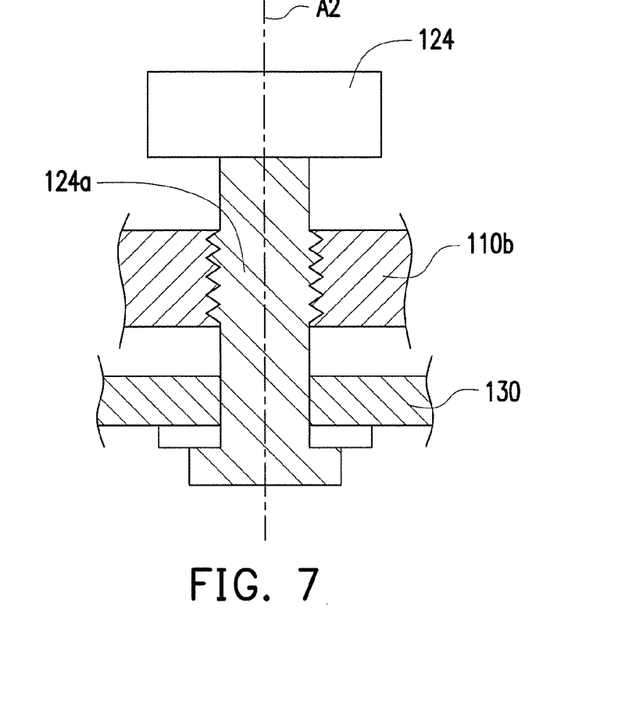
FIG. 7 is a cross-sectional view illustrating the light source device of FIG. 2 at a position of a second connecting element.
Figure 8:
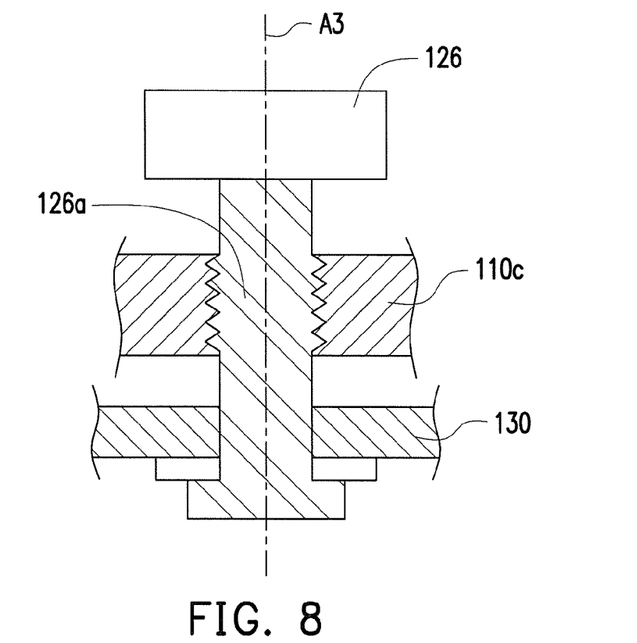
FIG. 8 is a cross-sectional view illustrating the light source device of FIG. 2 at a position of a third connecting element.

FIG. 6 is a cross-sectional view illustrating the light source device of FIG. 2 at a position of a first connecting element. FIG. 7 is a cross-sectional view illustrating the light source device of FIG. 2 at a position of a second connecting element. FIG. 8 is a cross-sectional view illustrating the light source device of FIG. 2 at a position of a third connecting element. Referring to FIGS. 2 and 6-8, the first connecting element 122 is pivoted to the base body 130 along a first axis A1 and has a first thread part 122a. The first thread part is screwed with the first connecting part 110a of the base 110, and the first connecting element 122 is adapted to rotate to drive the first connecting part 110a to move with respect to the base body 130 along the first axis A1.

Similarly, the second connecting element 124 is pivoted to the base body 130 along a second axis A2 and has a second thread part 124a. The second thread part 124a is screwed with the second connecting part 110b of the base 110, and the second connecting element 124 is adapted to rotate to drive the second connecting part 110b to move with respect to the base body 130 along the second axis A2. The third connecting element 126 is pivoted to the base body 130 along a third axis A3 and has a third thread part 126a. The third thread part 126a is screwed with the third connecting part 110c of the base 110, and the third connecting element 126 is adapted to rotate to drive the third connecting part 110c to move with respect to the base body 130 along the third axis A3. The first axis A1, the second axis A2, and the third axis A3 are parallel to each other and perpendicular to the display plane 50a shown in FIG. 1.

With the configuration of the adjusting mechanism 120, the user may rotate the first connecting element 122, the second connecting element 124, and the third connecting element 126 to drive the base 112 to move with respect to the base body 130 in the direction perpendicular to the display plane 50a shown in FIG. 1. In addition, the user may rotate only one of the first connecting element 122, the second connecting element 124, and the third connecting element 126 to drive the base 112 to rotate in the axial direction not perpendicular to the display plane 50a shown in FIG. 1. Driving the base 112 to move or rotate may adjust the relative positions of the invisible light curtain C emitted from the first light source 114 on the base 112 and the display plane 50a, thus the invisible light curtain C and the display plane 50a are able to maintain the same distance (i.e. parallel to each other) at any position. In this embodiment, the appropriate distance between the invisible light curtain C and the display plane 50a is approximately 5 mm. However, the invention is not limited thereto. In different configurations, different distances may be kept.

In addition, referring to FIGS. 2 and 6-8, at least one elastic element (not shown) may be disposed between the base 112 and the base body 130. When the first connecting element 122, the second connecting element 124, and the third connecting element 126 are driven to move or rotate the base 112, tolerances of screwing between the thread parts of the connecting elements and the first connecting part 110a, the second connecting part 110b, and the third connecting part 110c of the base 112 may be compensated with an elastic force of the elastic element, thereby making the movement or rotation of the base 112 with respect to the base body 130 more stable. Moreover, the elastic element may be respectively set at the first connecting element 122 and located between the first connecting part 110a and the base body 130, set at the second connecting element 124 and located between the second connecting part 110b and the base body 130, and set at the third connecting element 126 and located between the third connecting part 110c and the base body 130.

Figure 9:
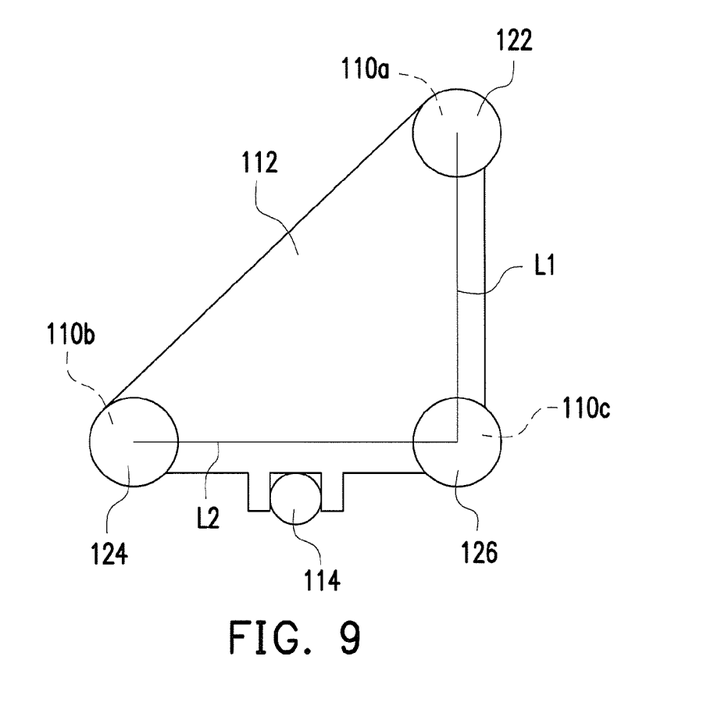
FIG. 9 is a top schematic view illustrating a part of components of the light source device of FIG. 2.

FIG. 9 is a top schematic view illustrating a part of components of the light source device of FIG. 2. Referring to FIGS. 2 and 9, the first light source 114 and the second light sources 116 (shown in FIG. 2) are disposed between the first connecting part 122 and the third connecting part 126 or between the second connecting part 124 and the third connecting part 126 (as shown in FIG. 2, it is illustrated that the first light source 114 and the second light sources 116 are disposed between the second connecting part 124 and the third connecting part 126). A connecting line L1 between the first connecting part 122 and the third connecting part 126 is perpendicular to a connecting line L2 between the second connecting part 124 and the third connecting part 126, as shown in FIG. 9.

When the user rotates the first connecting element 122 to drive the first connecting part 110a to move along the first axis A1, the base 112 rotates by using the connecting line L2 between the second connecting part 124 and the third connecting part 126 as a pivot. Meanwhile, the base 112 does not rotate by using the connecting line L1 between the first connecting part 122 and the third connecting part 126 as a pivot. Similarly, when the user rotates the second connecting element 124 to drive the second connecting part 110b to move along the second axis A2, the base 112 rotates by using the connecting line L1 between the first connecting part 122 and the third connecting part 126 as a pivot. Meanwhile, the base 112 does not rotate by using the connecting line L2 between the second connecting part 124 and the third connecting part 126 as a pivot. Accordingly, a rotating angle of the base 112 by using the connecting line L1 as a pivot may be independently adjusted, and a rotating angle of the base 112 by using the connecting line L2 as a pivot may be independently adjusted, thereby improving an adjustment efficiency of the rotating angle of the base 112.

In the embodiment, the configuration and operation of the third connecting element 126 are the same as those of the first connecting element 122 and the second connecting element 124. However, the invention is not limited thereto. In other embodiments, the third connecting element 126 may be designed to be without the third thread part 126a, and the third connecting element 126 maybe fixed to the base body 130 to prevent the third connecting element 126 from being able to rotate with respect the base body 130. In addition, the third connection part 110c may be rotatably connected to the third connecting element 126. With such design, the user may still drive the base 112 to rotate with respect to the base body 130 along the axial direction not perpendicular to the display plane 50a shown in FIG. 1 by rotating the first connecting element 122 or the second connecting element 124, so as to adjust the relative positions of the invisible light curtain C and the display plane 50a.

Figure 10:
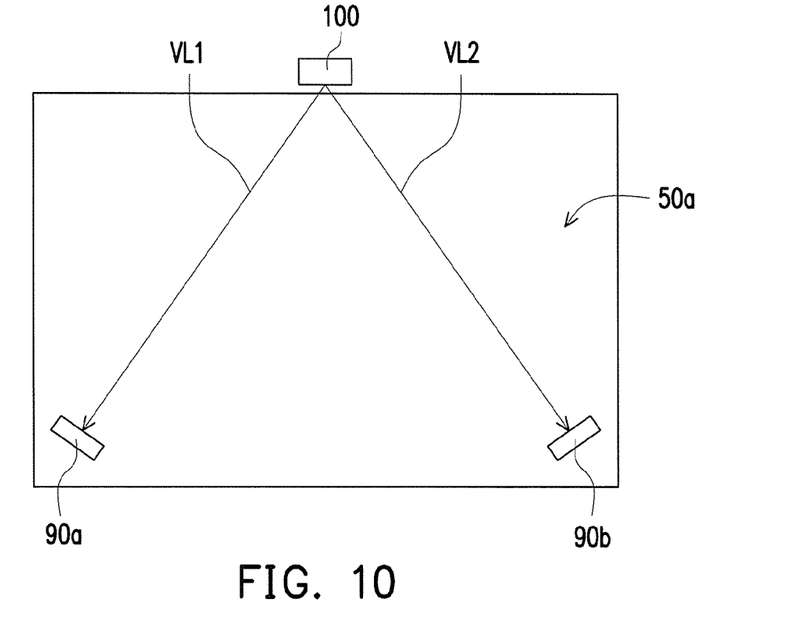
FIG. 10 is a schematic view illustrating observing positions of a first visible light beam and a second visible light beam of FIG. 3 by using a first aligning element and a second aligning element.

FIG. 10 is a schematic view illustrating observing positions of a first visible light beam and a second visible light beam of FIG. 3 by using a first aligning element and a second aligning element. When Step S606 shown in FIG. 4 is performed, a first aligning element 90a and a second aligning element 90b are provided on the display plane 50a as shown in FIG. 10. The first visible light beam VL1 passes through the first aligning element 90a, and the second visible light beam VL2 passes through the second aligning element 90b. The first and second aligning elements 90a and 90b may be translucent alignment tools disposed to be perpendicular to the display plane 50a. However, the invention is not limited thereto. The user may visually observe a light spot that the first visible light beam VL1 projects on the first aligning element 90a to determine a distance of the first visible light beam VL1 between the first aligning element 90a and the display plane 50a, and visually observe a light spot that the second visible light beam VL2 projects on the second aligning element 90b to determine a distance of the second visible light beam VL2 between the second aligning element 90b and the display plane 50a. The first aligning element 90a and the second aligning element 90b are, for example, provided with a scale for the user to determine the distances between the light spots and the display plane 50a.

Continuing to Step S608 shown in FIG. 4, the user adjusts the relative positions of the base 112 and the display plane 50a by rotating the first connecting element 122, the second connecting element 124, and the third connecting element 126 (as shown in FIGS. 6-9), so as to adjust the distance between the light spot that the first visible light beam VL1 projects on the first aligning element 90a and the display plane 50a the same as the distance between the light spot that the second visible light beam VL2 projects on the second aligning element 90b and the display plane 50a, such that the plane formed by the first visible light beam VL1 and the second visible light beam VL2 is parallel to the display plane 50a. At this time, the invisible light curtain C coinciding with or parallel to the first visible light beam VL1 and the second visible light beam VL2 is parallel to the display plane 50a, as shown in FIG. 5A, and the invisible light curtain C and the display plane 50a are kept with an appropriate distance for the user to perform a touch operation.

Figure 11:
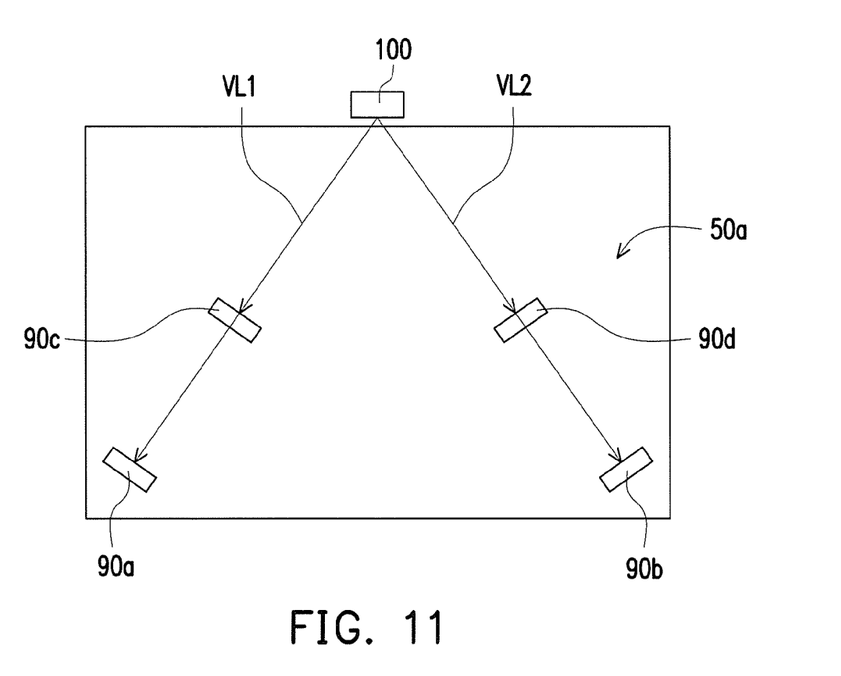
FIG. 11 is a schematic view illustrating observing the positions of the first visible light beam and the second visible light beam of FIG. 3 by using the first aligning element, the second aligning element, a third aligning element, and a fourth aligning element.

FIG. 11 is a schematic view illustrating observing the positions of the first visible light beam and the second visible light beam of FIG. 3 by using the first aligning element, the second aligning element, a third aligning element, and a fourth aligning element. In addition to providing the first aligning element 90a and the second aligning element 90b on the display plane 50a as shown in FIG. 10, the user may further provide a third aligning element 90c and a fourth aligning element 90d on the display plane 50a, as shown in FIG. 11. The first aligning element 90a and the third aligning element 90c are disposed to be spaced apart, and the second aligning element 90b and the fourth aligning element 90d are disposed to be spaced apart. The first visible light beam VL1 simultaneously passes through the first aligning element 90a and the third aligning element 90c, and the second visible light beam VL2 simultaneously passes through the second aligning element 90b and the fourth aligning element 90d. The third aligning element 90c and the fourth aligning element 90d of this embodiment are translucent elements and disposed to be perpendicular to the display plane 50a, such that the first visible light beam VL1 passes through the third aligning element 90c to arrive at the first aligning element 90a, and the second visible light beam VL2 passes through the fourth aligning element 90d to arrive at the second aligning element 90b.

The user may visually observe a light spot that the first visible light beam VL1 projects on the third aligning element 90c to determine a distance of the first visible light beam VL1 between the third aligning element 90c and the display plane 50a, and visually observe a light spot that the second visible light beam VL2 projects on the fourth aligning element 90d to determine a distance of the second visible light beam VL2 between the fourth aligning element 90d and the display plane 50a. The third aligning element 90c and the fourth aligning element 90d are provided with a scale for the user to determine the distances between the light spots and the display plane 50a.

Then, the distance between the light spot that the first visible light beam VL1 projects on the first aligning element 90a and the display plane 50a is adjusted to be the same as the distance between the light spot that the first visible light beam VL1 projects on the third aligning element 90c and the display plane 50a to make the first visible light beam VL1 parallel to the display plane 50a. In addition, the distance between the light spot that the second visible light beam VL2 projects on the second aligning element 90b and the display plane 50a is adjusted to be the same as the distance between the light spot that the second visible light beam VL2 projects on the fourth aligning element 90d and the display plane 50a to make the second visible light beam VL2 parallel to the display plane 50a.

In addition, the distance between the light spot that the first visible light beam VL1 projects on the third aligning element 90c and the display plane 50a is adjusted to be the same as the distance between the light spot that the second visible light beam VL2 projects on the fourth aligning element 90d and the display plane 50a to make the plane formed by the first visible light beam VL1 and the second visible light beam VL2 parallel to the display plane 50a. At this time, the invisible light curtain C coinciding with or parallel to the first visible light beam VL1 and the second visible light beam VL2 is parallel to the display plane 50a, as shown in FIG. 5A, and the invisible light curtain C and the display plane 50a are kept with an appropriate distance for the user to perform a touch operation. The configuration of the third aligning element 90c and the fourth aligning element 90d allows to further confirm that the first visible light beam VL1 and the second visible light beam VL2 are both parallel to the display plane 50a, thereby increasing the accuracy of the adjustment to the invisible light curtain C.

In view of the foregoing, the embodiments of the invention have at least one of the following characteristics. In the embodiments of the invention, the relative positions of the invisible light curtain and the display plane are determined and adjusted by observing two visible light beam (i.e. the first visible light beam and the second visible light beam) parallel to or coinciding with the invisible light curtain. Since the visible light beams may form a plane parallel to or coinciding with the invisible light curtain, whether distances between all positions of the invisible light curtain and the display plane are adjusted appropriately may be correctly determined by using the method, thereby improving the accuracy of the adjustment to the invisible light curtain. In addition, since two visible light beams, instead of one visible light beam as in the conventional techniques, are adapted as the basis of adjustment in the method, it only needs to set the visible light beams to be parallel to or coincide with the invisible light curtain during a process of assembling and configuring the light source device, while the light source device becomes more accurate after the adjustment as compared with setting only one visible light beam to be parallel or coincide with the invisible light curtain.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source device, comprising:
   a light source module, comprising:
   a base;
   a first light source, disposed on the base and adapted to emit an invisible light curtain, wherein the invisible light curtain ranges over a display plane; and
   at least two second light sources, disposed on the base and adapted to respectively emit a first visible light beam and a second visible light beam, wherein the first visible light beam is parallel to the invisible light curtain, and the second visible light beam is parallel to the invisible light curtain; and
   an adjusting mechanism, disposed on the base and adapted to adjust relative positions of the base and the display plane, wherein the first light source is adapted to be turned on while the second light sources are adapted to be turned off after a plane formed by the first visible light beam and the second visible light beam is adjusted by the adjusting mechanism to be parallel to the display plane.

2. The light source device as claimed in claim 1, wherein the first visible light beam coincides with the invisible light curtain, and the second visible light beam coincides with the invisible light curtain.

3. The light source device as claimed in claim 1, wherein the first visible light beam and the second visible light beam are not parallel to and not collinear with each other.

4. The light source device as claimed in claim 1, wherein the first visible light beam and the second visible light beam are parallel to each other but not collinear with each other.

5. The light source device as claimed in claim 1, wherein the adjusting mechanism drives the base to move along a direction perpendicular to the display plane.

6. The light source device as claimed in claim 1, wherein the adjusting mechanism drives the base to rotate along an axial direction not perpendicular to the display plane.

7. The light source device as claimed in claim 1, further comprising a base body, wherein the base body is adjacent to and fastened on the display plane, the base body has a first connecting part, a second connecting part, and a third connecting part, and the adjusting mechanism comprises:
   a first connecting element, pivoted to the base body along a first axis and having a first thread part, wherein the first thread part is screwed with the first connecting part, and the first connecting element rotates to drive the first connecting part to move with respect to the base body along the first axis;
   a second connecting element, pivoted to the base body along a second axis and having a second thread part, wherein the second thread part is screwed with the second connecting part, and the second connecting element rotates to drive the second connecting part to move with respect to the base body along the second axis; and
   a third connecting element, connected between the third connecting part and the base body.

8. The light source as claimed in claim 7, wherein the third connecting element is pivoted to the base body along a third axis and has a third thread part, the third thread part is screwed with the third connecting part, and the third connecting element rotates to drive the third connecting part to move with respect to the base body along the third axis.

9. The light source device as claimed in claim 8, wherein the first axis, the second axis, and the third axis are parallel to each other and perpendicular to the display plane.

10. The light source device as claimed in claim 7, wherein the third connecting element is fixed to the base body and the third connecting part is rotatably connected to the third connecting element, and the third connecting part is driven to rotate with respect to the third connecting element by rotating the first connecting element or the second connecting element.

11. The light source device as claimed in claim 7, wherein a connecting line between the first connecting part and the third connecting part is perpendicular to a connecting line between the second connecting part and the third connecting part, and the first light source and the at least two second light sources are disposed between the first connecting part and the third connecting part or disposed between the second connecting part and the third connecting part.

12. An adjusting method of operating a light source device, comprising:
   providing a light source module, wherein the light source module comprises a first light source and at least two second light sources, wherein the first light source is adapted to emit an invisible light curtain, the invisible light curtain ranges over a display plane, and the at least two second light sources are adapted to respectively emit a first visible light beam and a second visible light beam, the first visible light beam being parallel to the invisible light curtain, and the second visible light beam being parallel to the invisible light curtain;
   providing an adjusting mechanism, disposed on the light source module;
   turning on the second light sources;
   observing relative positions of the first visible light beam and the second visible light beam with respect to the display plane;
   adjusting the adjusting mechanism to enable a plane formed by the first visible light beam and the second visible light beam to be parallel to the display plane; and
   turning off the second light sources while turning on the first light source.

13. The adjusting method of operating the light source device as claimed in claim 12, wherein the step of observing the relative positions of the first visible light beam and the second visible light beam comprises:
   providing a first aligning element on the display plane, wherein the first visible light beam passes through the first aligning element;
   providing a second aligning element on the display plane, wherein the second visible light beam passes through the second aligning element;
   observing a light spot that the first visible light beam projects on the first aligning element; and
   observing a light spot that the second visible light beam projects on the second aligning element.

14. The adjusting method of operating the light source device as claimed in claim 13, further comprising:
   adjusting to keep a distance between the light spot that the first visible light beam projects on the first aligning element and the display plane the same as a distance between the light spot that the second visible light beam projects on the second aligning element and the display plane.

15. The adjusting method of operating the light source device as claimed in claim 13, wherein the step of observing the positions of the first visible light beam and the second visible light beam further comprises:
   providing a third aligning element on the display plane, wherein the first aligning element and the third aligning element are disposed to be spaced apart, and the first visible light beam passes through the first aligning element and the third aligning element at the same time;
   providing a fourth aligning element on the display plane, wherein the second aligning element and the fourth aligning element are disposed to be spaced apart, and the second visible light beam passes through the second aligning element and the fourth aligning element at the same time;
   observing a light spot that the first visible light beam projects on the third aligning element; and
   observing a light spot that the second visible light beam projects on the fourth aligning element.

16. The adjusting method of operating the light source device as claimed in claim 15, further comprising:

adjusting to keep a distance between the light spot that the first visible light beam projects on the first aligning element and the display plane the same as a distance between the light spot that the first visible light beam projects on the third aligning element and the display plane;

adjusting to keep a distance between the light spot that the second visible light beam projects on the second aligning element and the display plane the same as a distance between the light spot that the second visible light beam projects on the fourth aligning element and the display plane; and adjusting to keep the distance between the light spot that the first visible light beam projects on the third aligning element and the display plane the same as the distance between the light spot that the second visible light beam projects on the fourth aligning element and the display plane.

17. The adjusting method of operating the light source device as claimed in claim 15, wherein the third aligning element is a light-transmitting element, the fourth aligning element is a light transmitting element, and a step of emitting the first visible light beam and the second visible light beam comprises:

making the first visible light beam pass through the third aligning element to arrive at the first aligning element; and making the second visible light beam pass through the fourth aligning element to arrive at the third aligning element.

18. The adjusting method of operating the light source device as claimed in claim 12, wherein the light source module comprises a base, the first light source, the at least two second light sources, and the adjusting mechanism disposed on the base, wherein the step of adjusting the relative positions of the invisible light curtain and the display plane comprises:

driving the base to move along a direction perpendicular to the display plane by the adjusting mechanism.

19. The adjusting method of operating the light source device as claimed in claim 12, wherein the light source module comprises a base, the first light source, the at least two second light sources, and the adjusting mechanism disposed on the base, wherein the step of adjusting the relative positions of the invisible light curtain and the display plane comprises:

driving the base to rotate along an axial direction not perpendicular to the display plane by the adjusting mechanism.

* * * * *